US008740738B2

(12) United States Patent
Sakanaka et al.

(10) Patent No.: US 8,740,738 B2
(45) Date of Patent: Jun. 3, 2014

(54) HIGH LOAD TRANSMISSION V-BELT

(75) Inventors: Hiroyuki Sakanaka, Hyogo (JP); Mitsuhiko Takahashi, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 442 days.

(21) Appl. No.: 13/131,472

(22) PCT Filed: Nov. 20, 2009

(86) PCT No.: PCT/JP2009/006269
§ 371 (c)(1),
(2), (4) Date: May 26, 2011

(87) PCT Pub. No.: WO2010/061564
PCT Pub. Date: Jun. 3, 2010

(65) Prior Publication Data
US 2011/0237377 A1 Sep. 29, 2011

(30) Foreign Application Priority Data

Nov. 26, 2008 (JP) .................................. 2008-300479

(51) Int. Cl.
*F16G 5/06* (2006.01)
(52) U.S. Cl.
USPC .......................................... 474/242; 474/265
(58) Field of Classification Search
CPC .................................... F16G 5/16; F16G 5/166
USPC .................................... 474/238, 242, 248, 265
See application file for complete search history.

(56) References Cited

U.S. PATENT DOCUMENTS

| 6,283,882 | B1 | 9/2001 | Nonaka et al. |
| 7,097,581 | B2 | 8/2006 | Inukai et al. |
| 7,798,927 | B2 * | 9/2010 | Ishida et al. ............ 474/8 |
| 2004/0033855 | A1 | 2/2004 | Inukai et al. |
| 2010/0120546 | A1 | 5/2010 | Suzuki et al. |

FOREIGN PATENT DOCUMENTS

| JP | 2000-120794 | 4/2000 |
| JP | 2000-120798 | 4/2000 |
| JP | 2004-076849 | 3/2004 |
| JP | 2004-076875 | 3/2004 |
| JP | 2008-133855 | 6/2008 |

OTHER PUBLICATIONS

International Search Report, PCT/JP2009/006269, Feb. 16, 2010.

\* cited by examiner

*Primary Examiner* — William E Dondero
*Assistant Examiner* — Robert T Reese
(74) *Attorney, Agent, or Firm* — Young & Thompson

(57) ABSTRACT

In a high load transmission V-belt, a plurality of blocks 20 are attached and fixed to a tension band 10 extending in a belt length direction in a state in which each of the blocks 20 are arranged so as to sandwich an engagement section 18 of the tension band 10 in an inter-beam clearance portion 26 formed between upper and lower beam portions 23, 24. An increased amount of change $\Delta T$ in dimension T of the engagement section 18 of the tension band 10 in a belt thickness direction due to thermal expansion is equal to or less than an amount of change $\Delta G$ in dimension G of the inter-beam clearance portion 26 of the block 20 in the belt thickness direction while running the belt ($\Delta T \le \Delta G$).

2 Claims, 3 Drawing Sheets

US 8,740,738 B2

HIGH LOAD TRANSMISSION V-BELT

TECHNICAL FIELD

The present invention relates to a high load transmission V-belt used as, e.g., a transmission belt for a belt-type continuously variable transmission of an automobile, and particularly relates to measures to avoid insecurely-fixed blocks due to an elasticity loss of a tension band, which arises from thermal expansion while running the belt.

BACKGROUND ART

Generally, the block belt of this type includes a tension band required for torque transmission, and blocks receiving thrust from a pulley. In such a block belt, reinforcing material made of highly elastic metal such as aluminum alloy is buried in the blocks, and the blocks are molded with resin such as phenol resin, resulting in enhancement of block strength. Thus, the block belt has a structure which resists to lateral pressure from the pulley and allows high load transmission.

The tension band is press-fitted to the plurality of blocks, and therefore a single belt is formed. Thus, while running the belt, a belt temperature is increased due to a compression strain arising from the press-fitting of the tension band and a bending strain arising from bending of the belt, and heat of the belt thermally expands a rubber portion of the tension band. As a result, more heat is generated from the belt. In course of time, elasticity of the tension band has been lost due to permanent deformation of the rubber portion. A portion between each of the blocks and the tension band is loosened, thereby causing a clearance between each of the blocks and the tension band. There is a problem that such a clearance causes an oscillation of the blocks, and increased force input to the blocks damages the blocks.

In order to obtain both of durability and heat resistance, a high load transmission V-belt in which a compression allowance is defined between a block and a tension band has been proposed as described in Patent Document 1.

CITATION LIST

Patent Document

PATENT DOCUMENT 1: Japanese Patent Publication No. 2000-120794

SUMMARY OF THE INVENTION

Technical Problem

In the conventional belt described above, occurrence of the clearance can be suppressed to the minimum, but the measures taken for such a belt are far from fully satisfactory. Thus, further improvement is required to realize a structure in which the clearance between each of the blocks and the tension belt is not caused, and the oscillation of the blocks are reduced.

The present invention has been made in view of the foregoing, and it is an objective of the present invention to avoid an elasticity loss of a tension band due to an increase in clamping allowance in a high load transmission V-belt in which a plurality of blocks are attached and fixed to the tension band extending in a belt length direction so that the tension band is clamped in a clearance between upper and lower beams of each block, while running the high load transmission V-belt.

Solution to the Problem

In order to accomplish the foregoing objective, an increased amount of change in tension band thickness due to thermal expansion is set to be equal to or less than an amount of change in inter-beam clearance of a block in the present invention.

Specifically, the present invention is intended for a high load transmission V-belt (hereinafter referred to as a "block belt") including a tension band having tensile strength and extending in a belt length direction; and a plurality of blocks, each of which has an upper beam portion arranged on an outer surface side of the belt and a lower beam portion arranged on an inner surface side of the belt, and is attached and fixed to the tension band so as to sandwich the tension band in a belt thickness direction in an inter-beam clearance portion formed between the upper and lower beam portions, and which are in a state in which the blocks are arranged in the belt length direction.

An engagement section is a section of the tension band fitted into the inter-beam clearance portion of each of the blocks, and an increased amount of change $\Delta T$ in dimension T of the engagement section in the belt thickness direction (hereinafter referred to as an "engagement section thickness") due to thermal expansion is equal to or less than an amount of change $\Delta G$ in dimension G of the inter-beam clearance portion of each of the blocks in the belt thickness direction while running the belt ($\Delta T \leq \Delta G$).

In the foregoing configuration, if the tension band includes a core wire substantially extending in the belt length direction and arranged in a belt width direction, and a rubber portion stacked on the core wire on at least one of the outer and inner surface sides of the belt, an increased amount of change $\Delta Tg$ in dimension Tg of the rubber portion of the engagement section of the tension band in the belt thickness direction (hereinafter referred to as a "rubber portion thickness") may be the increased amount of change $\Delta T$ in engagement section thickness T due to the thermal expansion ($\Delta T = \Delta Tg$).

In such a state, a ratio of the rubber portion thickness Tg of the engagement section to the engagement section thickness T of the tension band may be equal to or less than 50% (Tg/T $\leq$ 50%), or the rubber portions of the engagement section directly contact the upper and lower beam portions of the block corresponding to the engagement section.

Advantages of the Invention

In the present invention, the increased amount of change in dimension of the engagement section of the tension band inserted to the inter-beam clearance portion of the block in the belt thickness direction due to the thermal expansion is equal to or less than the amount of change in dimension of the inter-beam clearance portion in the belt thickness direction while running the belt. Thus, a clamping allowance of the engagement section of the tension band by the inter-beam clearance portion of the block is not increased, and therefore an elasticity loss of the tension band due to the increase in clamping allowance is not caused. Consequently, a situation in which a clearance is caused between the tension band and the block and damages the block can be reduced or prevented before it occurs, thereby improving durability.

DESCRIPTION OF EMBODIMENTS

An embodiment will be described below with reference to the drawings.

Figure 1:
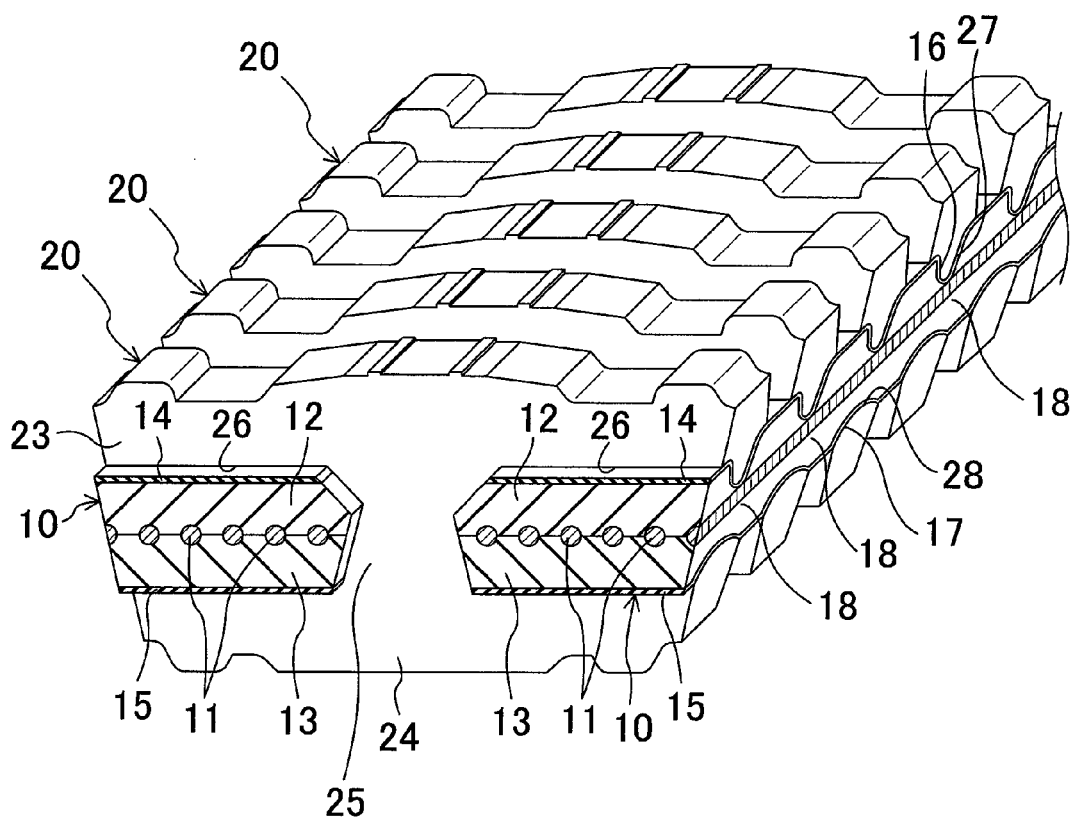
FIG. 1 is a perspective view illustrating an entire configuration of a block belt of an embodiment with its cross-sectional view.

FIG. 1 is a perspective view schematically illustrating a configuration of a block belt of the present embodiment, and the block belt is used for, e.g., a belt-type continuously variable transmission of an automobile.

The block belt includes a pair of tension bands 10 which extend in a belt length direction and which are arranged in a belt width direction, and a plurality of blocks 20 which are arranged in the belt length direction and which are attached and fixed to both of the tension bands 10.

Each of the tension bands 10 includes one or more core wires 11 which are helically wound so as to extend in the substantially belt length direction (direction extending from a lower left side to a upper right side as viewed in FIG. 1) and arranged in the belt width direction (horizontal direction as viewed in FIG. 1) on a belt pitch line of the block belt, an upper rubber portion 12 stacked on the core wires 11 on an outer surface side of the belt (upper side as viewed in FIG. 1), and a lower rubber portion 13 stacked on the core wires 11 on an inner surface side of the belt (lower side as viewed in FIG. 1). An upper fabric layer 14 is stacked on the upper rubber portion 12 on the outer surface side of the belt, whereas a lower fabric layer 15 is stacked on the lower rubber portion 13 on the inner surface side of the belt.

On the outer and inner surface sides of the belt in each of the tension bands 10, upper recessed portions 16 and lower recessed portions 17 formed so as to extend in the belt width direction and provided so as to face each other in a belt thickness direction are arranged at regular pitch in the belt length direction.

Figure 2:
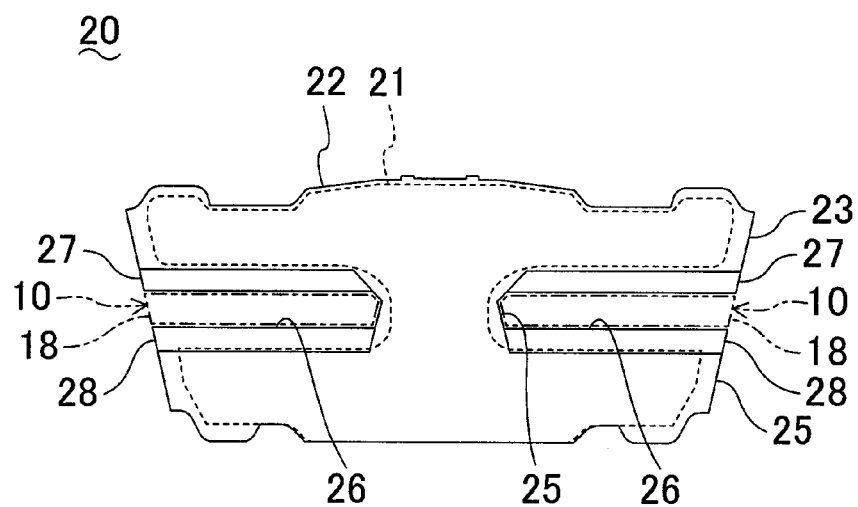
FIG. 2 is a front view illustrating the block belt of the embodiment.

As illustrated in FIG. 2, each of the blocks 20 includes a core material 21 made of metal (e.g., lightweight aluminum alloy), and a covering layer 22 made of resin (e.g., phenol resin) and provided so as to cover a surface of the core material 21. The block 20 further includes an upper beam portion 23 arranged so as to extend in the belt width direction (horizontal direction as viewed in FIG. 2) on the outer surface side of the belt (upper side as viewed in FIG. 2), a lower beam portion 24 arranged so as to extend in the belt width direction on the inner surface side of the belt (lower side as viewed in FIG. 2), and a pillar portion 25 extending in the belt thickness direction (vertical direction as viewed in FIG. 2) to connect the upper beam portion 23 and the lower beam portion 24 together at the middle of the block 20 in the belt width direction.

Two slit-like inter-beam clearance portions 26 each opening to a side of the block 20 in the belt width direction are formed between the upper beam portion 23 and the lower beam portion 24 on both sides of the block 20 in the belt width direction. Each of the two tension bands 10 is inserted to the inter-beam clearance portion 26. An upper raised portion 27 provided so as to protrude toward the lower beam portion 24 side and engaged with the upper recessed portion 16 of the tension band 10 is formed in a section of the upper beam portion 23 on the inner surface side of the belt in the inter-beam clearance portion 26. A lower raised portion 28 provided so as to protrude toward the upper beam portion 23 side and engaged with the lower recessed portion 17 of the tension band 10 is formed in a section of the lower beam portion 24 on the outer surface side of the belt in the inter-beam clearance portion 26. The upper raised portions 27 and the lower raised portions 28 of the blocks 20 are engaged with the upper recessed portions 16 and the lower recessed portions 17 of the tension bands 10, and therefore the blocks 20 are attached and fixed to the tension bands 10 in the belt length direction.

In the present embodiment, an engagement section 18 is a section of the tension band 10 between a bottom surface of the upper recessed portion 16 and a bottom surface of the lower recessed portion 17, and an increased amount of change $\Delta T$ in dimension T of the engagement section 18 in the belt thickness direction due to thermal expansion is set to be equal to or less than an increased amount of change $\Delta G$ in dimension G of the inter-beam clearance portion 26 of the block 20 in the belt thickness direction while running the belt ($\Delta T \leq \Delta G$).

Suppose that, under conditions in which the dimension G of the inter-beam clearance portion 26 of the block 20 in the belt thickness direction (hereinafter referred to as an "inter-beam clearance") is equal to the dimension T of the engagement section 18 of the tension band 10 in the belt thickness direction (hereinafter referred to as an "engagement section thickness") (G=T), and a dimension Tc of the core wire 11 in the belt thickness direction (hereinafter referred to as a "core wire portion thickness") and a dimension Tf of the upper and lower fabric layers 14, 15 in the belt thickness direction (hereinafter referred to as a "fabric layer thickness") are constant in the engagement section 18, the engagement section thickness T is changed. A principle of a change in relationship between the increased amount of change $\Delta T$ in engagement section thickness T and the amount of change $\Delta G$ in inter-beam clearance G while running the belt in the foregoing state will be described.

Specifically, as shown in Table 1, the engagement section thickness T of the tension band 10 was changed to seven values of 1.0, 1.5, 1.6, 2.0, 2.5, 3.0, and 4.0. The increased amount of change $\Delta T$ in engagement section thickness T and the amount of change $\Delta G$ in inter-beam clearance G were obtained for each of the engagement section thicknesses T. Then, a value obtained by subtracting the amount of change $\Delta G$ in inter-beam clearance G from the increased amount of change $\Delta T$ in engagement section thickness T, i.e., an amount of change $\Delta P$ (=$\Delta T - \Delta G$) in clamping allowance P (=T−G) of the engagement section 18 by the inter-beam clearance portion 26 was calculated. Since the core wire portion thickness Tc and the fabric layer thickness Tf show little change, the increased amount of change $\Delta T$ in engagement section thickness T due to the thermal expansion is regarded as being equal to an increased amount of change $\Delta Tg$ in rubber portion thickness Tg ($\Delta T = \Delta Tg$). Thus, the amount of change $\Delta P$ is regarded as a value obtained by subtracting the amount of change $\Delta G$ in inter-beam clearance G from the increased amount of change $\Delta Tg$ in rubber portion thickness Tg. The amount of change $\Delta G$ in inter-beam clearance G while running the belt is mostly due to lateral pressure applied from a pulley to the upper beam portion 23 and the lower beam portion 24 of the block 20. Thus, the amount of change $\Delta G$ in inter-beam clearance G is constant ($\Delta G$=0.048 [mm]) regardless of the inter-beam clearance G.

TABLE 1

|  | 1st Example | 2nd Example | 3rd Example | 4th Example | 5th Example | 6th Example | 7th Example |
| --- | --- | --- | --- | --- | --- | --- | --- |
| Engagement Section Thickness [mm] | 1.0 | 1.5 | 1.6 | 2.0 | 2.5 | 3.0 | 4.0 |
| Core Wire Portion Thickness [mm] | 0.6 | 0.6 | 0.6 | 0.6 | 0.6 | 0.6 | 0.6 |
| Fabric Layer Thickness [mm] | 0.2 | 0.2 | 0.2 | 0.2 | 0.2 | 0.2 | 0.2 |
| Rubber Portion Thickness [mm] | 0.2 | 0.7 | 0.8 | 1.2 | 1.7 | 2.2 | 3.2 |
| Ratio of Rubber Portion Thickness to Engagement Section Thickness [%] | 20.0 | 46.7 | 50.0 | 60.0 | 68.0 | 73.3 | 80.0 |
| Linear Coefficient of Expansion for Rubber Portion |  |  |  | $5.60 \times 10^{-4}$ |  |  |  |
| Amount of Rise in Temperature [° C.] |  |  |  | 110 |  |  |  |
| Increased Amount of Change in Rubber Portion Thickness [mm] | 0.012 | 0.043 | 0.049 | 0.074 | 0.105 | 0.136 | 0.197 |
| Amount of Change in Inter-Beam Clearance while Running the Belt [mm] | 0.048 | 0.048 | 0.048 | 0.048 | 0.048 | 0.048 | 0.048 |
| Amount of Change in Clamping Allowance [mm] | −0.036 | −0.005 | +0.001 | +0.026 | +0.055 | +0.087 | +0.149 |

Figure 3:
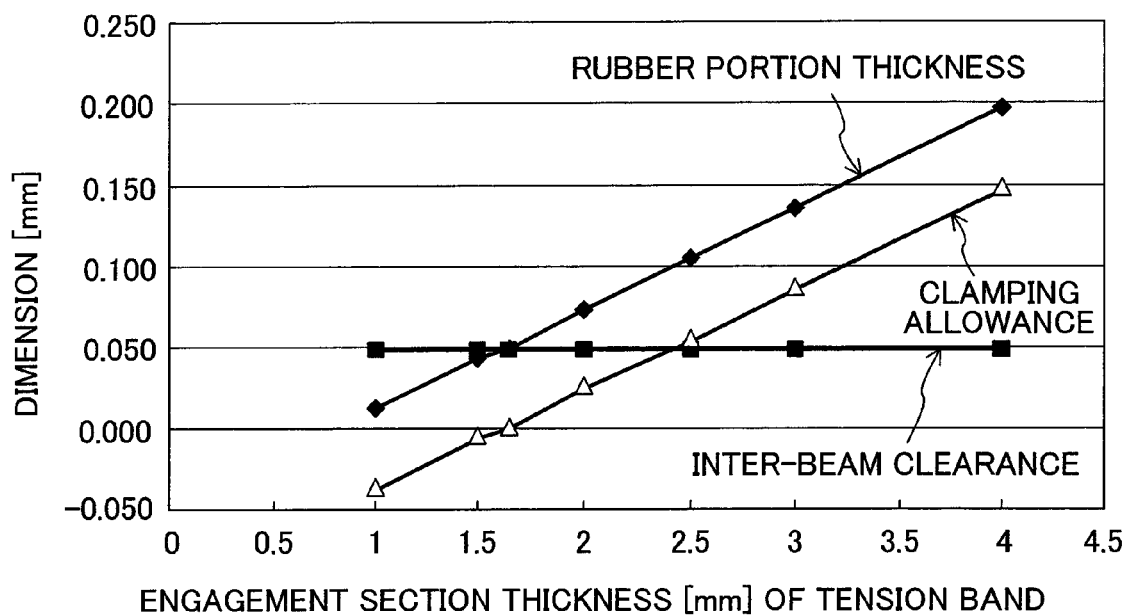
FIG. 3 is a graph illustrating properties such as an amount of change of a clamping allowance for each of thicknesses of an engagement section, an increased amount of change in rubber portion thickness, and an amount of change of an inter-beam clearance.

Calculated values of the amount of change ΔP in clamping allowance P for each of the engagement section thicknesses T are indicated by "white triangles" in a graph of FIG. 3, which illustrates properties. Note that, in the graph illustrating properties, the amount of change ΔTg in rubber portion thickness Tg for each of the engagement section thicknesses T, and the amount of change ΔG in inter-beam clearance G for each of the engagement section thicknesses T are also indicated by "black diamonds" and "black squares," respectively.

As will be seen from Table 1 and the graph illustrating properties, the amount of change ΔP in clamping allowance P shows a negative value when the rubber portion thickness Tg is small, and is changed to a positive value as the rubber portion thickness Tg is increased. Suppose that the amount of change ΔP in clamping allowance is 0.001 [mm] (substantially 0.0 mm considering a configuration in which the rubber portion has elasticity) when the rubber portion thickness Tg is 0.8 [mm] (T=1.6 [mm]). It is assumed that, when the rubber portion thickness Tg exceeds 0.8 [mm] (T>1.6 [mm]), the amount of change ΔP in clamping allowance is changed from the negative value to the positive value. That is, the clamping allowance of the engagement section 18 by the inter-beam clearance portion 26 is increased.

Thus, in such a case, the rubber portion thickness Tg is Tg≤0.8 [mm] (T≤1.6 [mm]), i.e., a ratio Tg/T of the rubber portion thickness Tg to the engagement section thickness T is equal to or less than 50% (Tg/T≤50%), and therefore the increased amount of change ΔT in engagement section thickness T due to heat generation while running the belt is suppressed to equal to or less than the amount of change ΔG in inter-beam clearance G of the block 20 (ΔT≤ΔG). Consequently, an elasticity loss of the tension band 10 due to an increase in clamping allowance of the engagement section 18 of the tension band 10 by the inter-beam clearance portion 26 of the block 20 can be reduced or prevented before it occurs.

Experimental Example

Evaluation on four items which are high-speed durability, an initial heat generation temperature, an amount of change in clamping allowance, and a block abrasion property when running belts having various rubber portion thicknesses Tg of a tension band 10 at high speed, and an experiment conducted for comprehensive determination based on the foregoing items will be described.

In the present experiment, eight block belts of first to fourth and sixth to ninth examples were used. A dimension of each section of the block belt is shown in Table 2. Six of such block belts, i.e., the block belts of the first to fourth and sixth to seventh examples are the same as the block belt shown in Table 1, and the two remaining block belts, i.e., the block belts of the eighth and ninth examples are newly added. Specifically, in the eighth example, upper and lower fabric layers 14, 15 of the tension band 10 are omitted, and the rubber portion thickness Tg is increased by a fabric layer thickness Tf. That is, upper and lower rubber portions 12, 13 directly contact upper and lower beam portions 23, 24 of a block 20 (see FIG. 5). In the ninth example, the rubber portion thickness Tg is greater than that of the first example by 0.2 mm, and an engagement section thickness T is also increased by 0.2 mm. Note that a relationship between an inter-beam clearance G of each of the blocks 20 and the engagement section thickness T of the tension band 10 is the same as that of the foregoing example.

TABLE 2

|  | 1st Example | 8th Example | 9th Example | 2nd Example | 3rd Example | 4th Example | 6th Example | 7th Example |
| --- | --- | --- | --- | --- | --- | --- | --- | --- |
| Engagement Section Thickness [mm] | 1.0 | 1.0 | 1.2 | 1.5 | 1.6 | 2.0 | 3.0 | 4.0 |
| Core Wire Portion Thickness [mm] | 0.6 | 0.6 | 0.6 | 0.6 | 0.6 | 0.6 | 0.6 | 0.6 |
| Fabric Layer Thickness [mm] | 0.2 | — | 0.2 | 0.2 | 0.2 | 0.2 | 0.2 | 0.2 |
| Rubber Portion Thickness [mm] | 0.2 | 0.4 | 0.4 | 0.7 | 0.8 | 1.2 | 2.2 | 3.2 |
| Ratio of Rubber Portion Thickness to Engagement Section Thickness [%] | 20.0 | 40.0 | 33.3 | 46.7 | 50.0 | 60.0 | 73.3 | 80.0 |
| High-Speed Durability [hrs] | 1000 | 1000 | 1000 | 800 | 800 | 700 | 500 | 300 |
| Amount of Rise in Temperature [° C.] | | | | 110 | | | | |
| Amount of Change in Clamping Allowance [mm] | 0.0 | 0.0 | 0.0 | 0.0 | 0.0 | +0.1 | +0.4 | +0.5 |
| Block Abrasion Amount [mm] | 0.30 | 0.30 | 0.30 | 0.35 | 0.35 | 0.35 | 0.40 | 0.45 |
| Determination | Excellent | Excellent | Excellent | Excellent | Excellent | Good | Good | Not Applicable |

Figure 4:
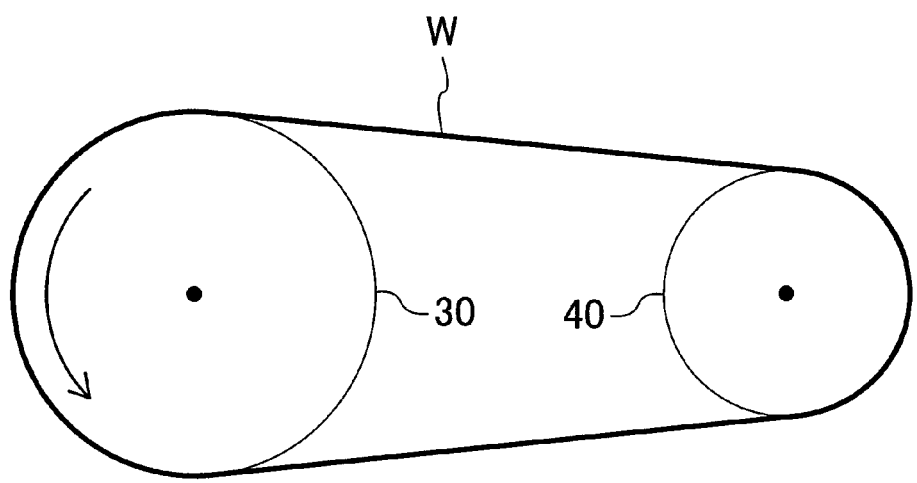
FIG. 4 is a side view schematically illustrating guidelines for an experiment conducted for evaluating high-speed durability.

Guidelines for the present experiment are as follows. As schematically illustrated in FIG. 4, a block belt W was trained around a drive pulley 30 having a pulley pitch diameter φ of 133.6 mm and a driven pulley 40 having a pulley pitch diameter φ of 61.4 mm, and the drive pulley 30 rotated at a rotational speed of 5016±60 rpm with a torque of 63.7 N·m under an atmosphere temperature of 20° C. to run the block belt W at high speed. Then, when a temperature of the block belt W reached 130° C. (an amount of rise in temperature reached 110° C.), the amount of change in clamping allowance [unit: mm] and the block abrasion amount were measured, and a time [hr] until at least one of the blocks is damaged was measured. Note that an abrasion amount for a dimension of the block in the belt width direction was measured as the block abrasion amount. Results of the foregoing measurements are also shown in Table 2. Note that a value of "0.0" for the "amount of change in clamping allowance" in Table 2 means that the clamping allowance was not changed at least to the positive value.

As will be seen from Table 2, the five block belts of the first to third, eighth, and ninth examples withstood a high-speed running of equal to or greater than 800 hr, and therefore fully satisfy requirements for practical use. In addition, the two block belts of the fourth and sixth examples withstood a high-speed running of equal to or greater than 500 hr, and therefore substantially satisfy the requirements for practical use. On the other hand, the block belt of the seventh example is barely able to withstand a high-speed running of 300 hr, and therefore is of no practical use in terms of the high-speed durability.

Further analysis shows as follows. Since the high-speed durability is degraded as the amount of change in claming allowance is increased, the elasticity loss of the tension band is caused due to the increase in amount of change in clamping allowance. This reduces attaching/fixing force of the tension band to each of the blocks. Thus, force input to each of the blocks is increased, and therefore it is likely to damage the blocks.

The increased amount of change ΔT in engagement section thickness T is substantially equal to the increased amount of change ΔTg in rubber portion thickness Tg. Thus, a less ratio of the rubber portion thickness Tg to the engagement section thickness T results in a smaller amount of change ΔP in clamping allowance, i.e., a less elasticity loss of the tension band 10. The present experimental example shows that it is preferred that the ratio of the rubber portion thickness Tg to the engagement section thickness T is equal to or less than 73.3%, and more preferably equal to or less than 50.0%.

Figure 5:
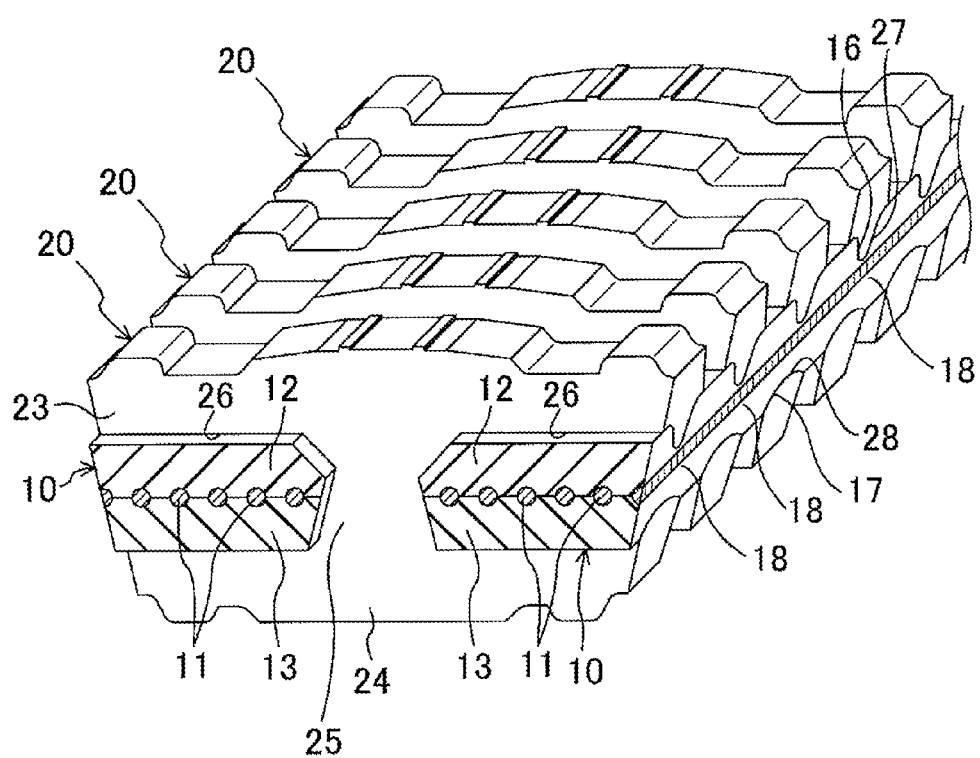
FIG. 5 is a perspective view illustrating a cross-sectional view of a block belt according to a second embodiment.

When comparing the block belts of the first and eighth examples, there is no notable difference in the high-speed durability, the amount of change in clamping allowance, and the block abrasion amount, but a steady-state temperature is slightly lower in the block belt of the eighth example than in the block belt of the first example. In addition, when comparing the block belts of the eighth and ninth examples, the rubber portion thickness Tg is the same (Tg=0.4 [mm]) between such block belts, but the steady-state temperature is lower in the block belt of the eighth example, which does not include the fabric layers 14, than in the block belt of the ninth example, which includes the fabric layers 14, 15. This is because a heat dissipation property of the rubber portions 12, 13 is improved by the direct contact of the rubber portions 12, 13 to the beam portions 23, 24 of the block 20, as shown in FIG. 5. Thus, even if the rubber portion thickness Tg is somewhat increased, the direct contact of the rubber portions 12, 13 to the block 20 without the fabric layers 14, 15 positively affects the problem due to the thermal expansion of the engagement section 18.

Thus, according to the present embodiment, the block belt includes the tension bands 10 having tensile strength and extending in the belt length direction; and the plurality of blocks, each of which has the upper beam portion 23 and the lower beam portion 24 arranged on the outer and inner surface sides of the belt, and which are attached and fixed to the tension bands 10 in a state in which the blocks are arranged in the belt length direction so as to sandwich the tension bands 10 in the belt thickness direction in the inter-beam clearance portions 26 formed between the upper and lower beam portions 23, 24. In the block belt, the increased amount of change ΔT in engagement section thickness T of the tension band 10 due to the thermal expansion is equal to or less than the amount of change ΔG in inter-beam clearance G of the block 20 while running the belt. Thus, the following situation can be reduced or prevented before it occurs: the increase in clamping allowance of the engagement section 18 by the inter-beam clearance portion 26 causes the elasticity loss of the tension band 10, the attaching/fixing force of the tension band 10 to the block 20 is weakened, external force received by the block 20 is increased, and then the block 20 is subject to damage. This contributes to improvement of the high-speed durability of the block belt.

INDUSTRIAL APPLICABILITY

The present invention is useful for the high load transmission V-belt used as, e.g., the transmission belt for the belt-type continuously variable transmission of the automobile.

DESCRIPTION OF REFERENCE CHARACTERS

10 Tension Band
12 Upper Rubber Portion (Rubber Portion)
13 Lower Rubber Portion (Rubber Portion)
18 Engagement Section
20 Block
23 Upper Beam Portion
24 Lower Beam Portion
26 Inter-Beam Clearance Portion

The invention claimed is:

1. A high load transmission V-belt, comprising:

a tension band having tensile strength and extending in a belt length direction; and a plurality of blocks, each of which has an upper beam portion arranged on an outer surface side of the belt and a lower beam portion arranged on an inner surface side of the belt, and is attached and fixed to the tension band so as to sandwich the tension band in a belt thickness direction in an inter-beam clearance portion formed between the upper and lower beam portions, and which are in a state in which the blocks are arranged in the belt length direction, wherein an engagement section is a section of the tension band fitted into the inter-beam clearance portion of each of the blocks, and an increased amount of change in a dimension (T) of the engagement section in the belt thickness direction due to thermal expansion is equal to or less than an amount of change in a dimension of the inter-beam clearance portion of each of the blocks in the belt thickness direction while running the belt, wherein the tension band includes a core wire substantially extending in the belt length direction and arranged in a belt width direction, and a rubber portion stacked on the core wire on at least one of the outer and inner surface sides of the belt, wherein the increased amount of change in the dimension (T) of the engagement section of the tension band in the belt thickness direction due to the thermal expansion is an increased amount of change in a dimension (Tg) of the rubber portion of the engagement section in the belt thickness direction, and wherein a ratio of the dimension (Tg) of the rubber portion of the engagement section in the belt thickness direction to the dimension (T) of the engagement section of the tension band in the belt thickness direction is equal to or less than 50%.

2. A high load transmission V-belt, comprising:

a tension band having tensile strength and extending in a belt length direction; and a plurality of blocks, each of which has an upper beam portion arranged on an outer surface side of the belt and a lower beam portion arranged on an inner surface side of the belt, and is attached and fixed to the tension band so as to sandwich the tension band in a belt thickness direction in an inter-beam clearance portion formed between the upper and lower beam portions, and which are in a state in which the blocks are arranged in the belt length direction, wherein an engagement section is a section of the tension band fitted into the inter-beam clearance portion of each of the blocks, and an increased amount of change in a dimension (T) of the engagement section in the belt thickness direction due to thermal expansion is equal to or less than an amount of change in a dimension of the inter-beam clearance portion of each of the blocks in the belt thickness direction while running the belt, wherein the tension band includes a core wire substantially extending in the belt length direction and arranged in a belt width direction, and a rubber portion stacked on the core wire on at least one of the outer and inner surface sides of the belt, wherein the increased amount of change in the dimension (T) of the engagement section of the tension band in the belt thickness direction due to the thermal expansion is an increased amount of change in a dimension (Tg) of the rubber portion of the engagement section in the belt thickness direction, and wherein the rubber portions of the engagement section of the tension band directly contact the upper and lower beam portions of the block corresponding to the engagement section.

* * * * *